United States Patent
Ferreri et al.

(10) Patent No.: US 10,440,236 B2
(45) Date of Patent: Oct. 8, 2019

(54) MULTI-OBJECT COLOR CACHING MECHANISM

(71) Applicant: Ricoh Company, Ltd., Tokyo (JP)

(72) Inventors: Vincent William Ferreri, Frederick, CO (US); Walter F. Kailey, Frederick, CO (US)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 15/909,545

(22) Filed: Mar. 1, 2018

(65) Prior Publication Data

US 2019/0273844 A1   Sep. 5, 2019

(51) Int. Cl.
*H04N 1/00* (2006.01)
*H04N 1/60* (2006.01)
*G06F 16/22* (2019.01)

(52) U.S. Cl.
CPC ....... *H04N 1/6072* (2013.01); *G06F 16/2255* (2019.01); *H04N 1/6019* (2013.01)

(58) Field of Classification Search
CPC .......................... H04N 1/6072; G06F 16/2255
See application file for complete search history.

(56) References Cited

U.S. PATENT DOCUMENTS

| 6,919,975 | B1* | 7/2005 | Haikin | H04N 1/6058 358/1.15 |
| 7,274,488 | B2 | 9/2007 | Stevens | |
| 8,050,505 | B2 | 11/2011 | Hirohata et al. | |
| 8,054,518 | B2* | 11/2011 | Larson | H04N 1/6072 358/1.9 |
| 8,514,447 | B2* | 8/2013 | Nishikawa | H04N 1/6072 358/1.9 |
| 9,596,478 | B2 | 3/2017 | Satomi et al. | |
| 2010/0271642 | A1* | 10/2010 | Huang | H04N 1/6019 358/1.9 |
| 2017/0147621 | A1 | 5/2017 | De Smet et al. | |
| 2017/0244868 | A1 | 8/2017 | Ferreri et al. | |

* cited by examiner

*Primary Examiner* — Benjamin O Dulaney
(74) *Attorney, Agent, or Firm* — Jaffery Watson; Mendonsa & Hamilton LLP

(57) ABSTRACT

A printing system is disclosed. The printing system includes a print controller including a color cache to store input colors and corresponding output colors for each of a plurality of object types and a color engine (CE) to receive an input color and an object type associated with the input color and perform a lookup of the color cache to determine whether the color cache includes the input color and a corresponding output color, wherein the CE performs the lookup of the color cache via forward indexing and backwards indexing.

20 Claims, 10 Drawing Sheets

FIG. 4

MULTI-OBJECT COLOR CACHING MECHANISM

FIELD OF THE INVENTION

The invention relates to the field of color management, and in particular, to caching color mappings for multiple object types in a single cache.

BACKGROUND

In commercial and transactional printers it is common to apply color transformations on a per object-type (e.g., image, text, line-art, smooth-shade, etc.) basis. Generally, a color conversion resource consisting of a single lookup table (LUT) and multiple color caches are employed for such transformations. An implementation of multiple color caches is necessitated by each object type requiring a separate color cache. Thus when performing color conversion processing an input color, an object-type is first queried in order to select the corresponding color cache from a conversion resource. This cache is then searched for the input color. However, such cache color redundancy is wasteful and inefficient.

Moreover, this arrangement results in an inability to share interpolated colors between the independent caches. For instance, if an interpolation for an input color of one object type is added to the color cache corresponding to the object type, the input color must be re-interpolated if encountered for a different object type. While it would be possible to have just one color cache in which a label or mark would indicate with which object-type(s) a particular color may be associated, such an implementation would require additional memory and logic checking.

Accordingly, a mechanism to provide a single color cache to store color mappings for multiple object types is desired.

SUMMARY

In one embodiment, a method is disclosed including receiving an input color; receiving an object type associated with the input color and performing a lookup of a color cache via backwards indexing to determine whether the color cache includes the input color and a corresponding output color, wherein the color cache stores input colors and the corresponding output colors for each of a plurality of object types.

BRIEF DESCRIPTION OF THE DRAWINGS

A better understanding of the present invention can be obtained from the following detailed description in conjunction with the following drawings, in which:

FIG. 4 illustrates a conventional color cache implementation;

DETAILED DESCRIPTION

A mechanism to provide a single color cache to store color mappings for multiple object types is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "unit" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
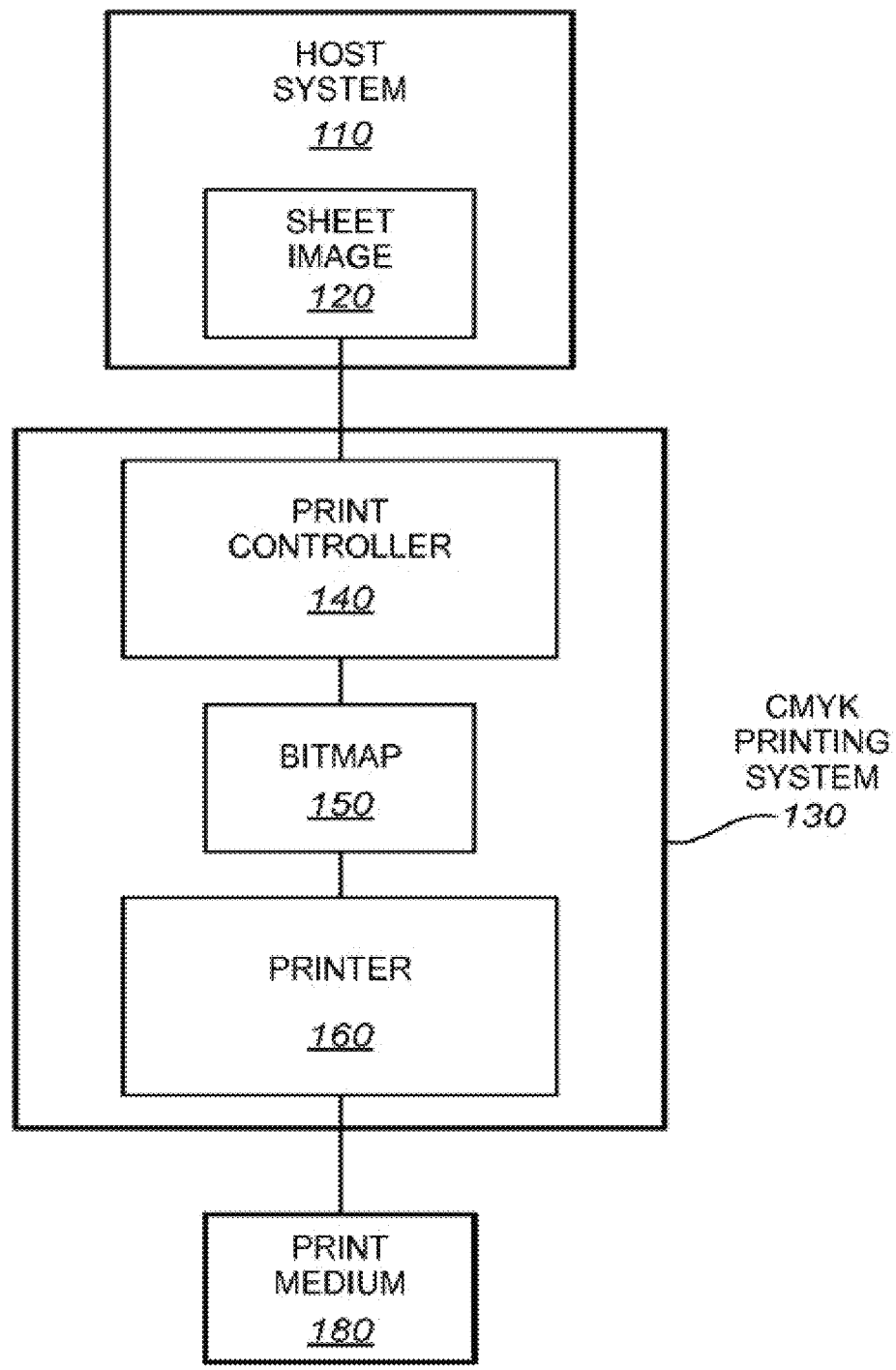
FIG. 1 is a block diagram illustrating one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 that is to be transmitted for printing onto the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
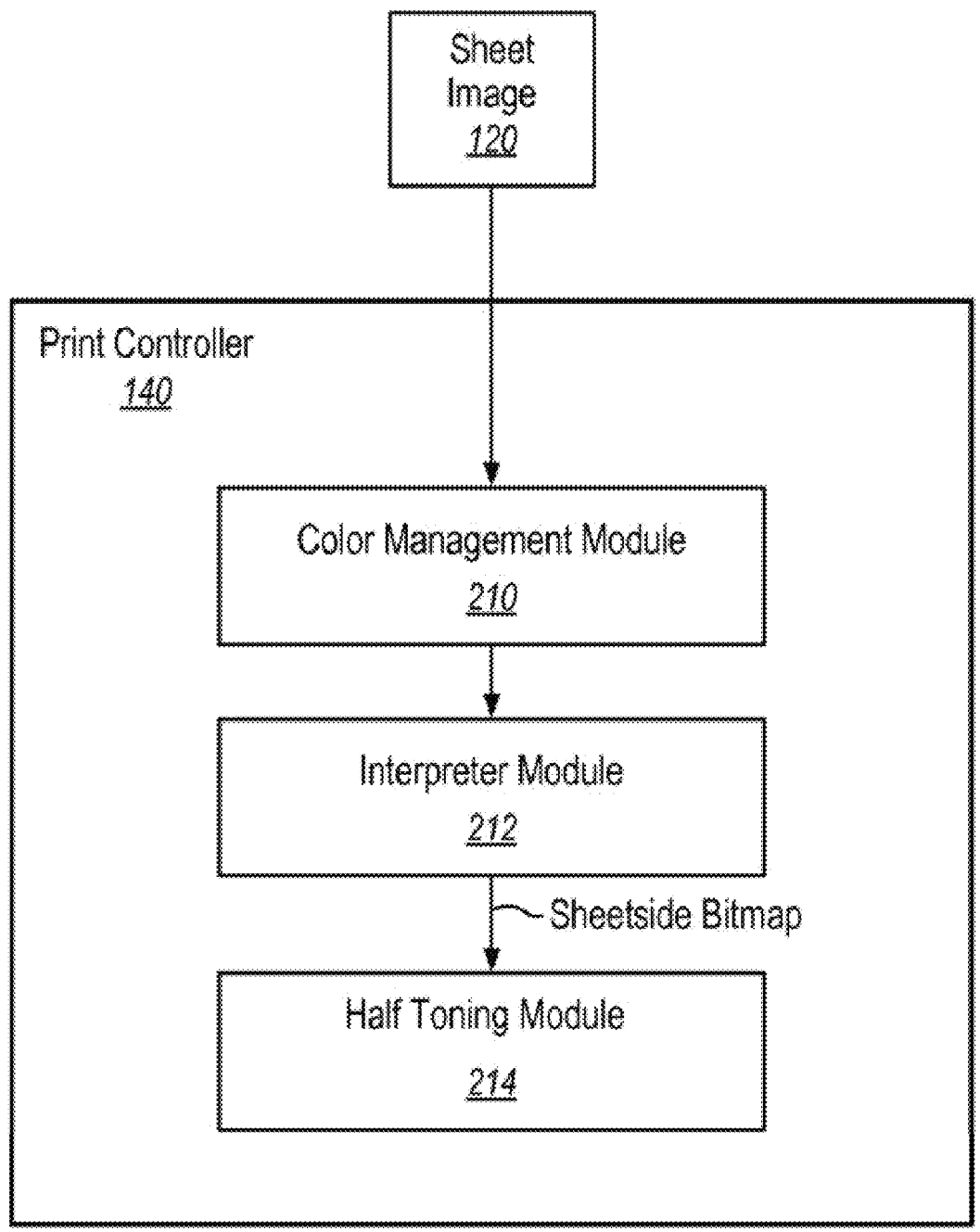
FIG. 2 is a block diagram illustrating one embodiment of a print controller.

FIG. 2 is a block diagram illustrating one embodiment of a print controller 140. The print controller 140 (e.g., DFE or digital front end), in its generalized form, includes color management module 210, interpreter module 212 and halftoning module 214. Color management module 210 provides a color mapping from an input color space to a printer 160 color space.

Interpreter module 212 is operable to interpret, render, rasterize, or otherwise convert images (e.g., raw sheetside images or printer language data such as sheet image 120) of a print job into sheetside bitmaps. The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines. Halftoning module 214 is operable to represent the sheetside bitmaps as halftone patterns of ink. For example, halftoning module 214 may convert the pixels to halftone patterns of CMYK ink for application to the paper.

Figure 3:
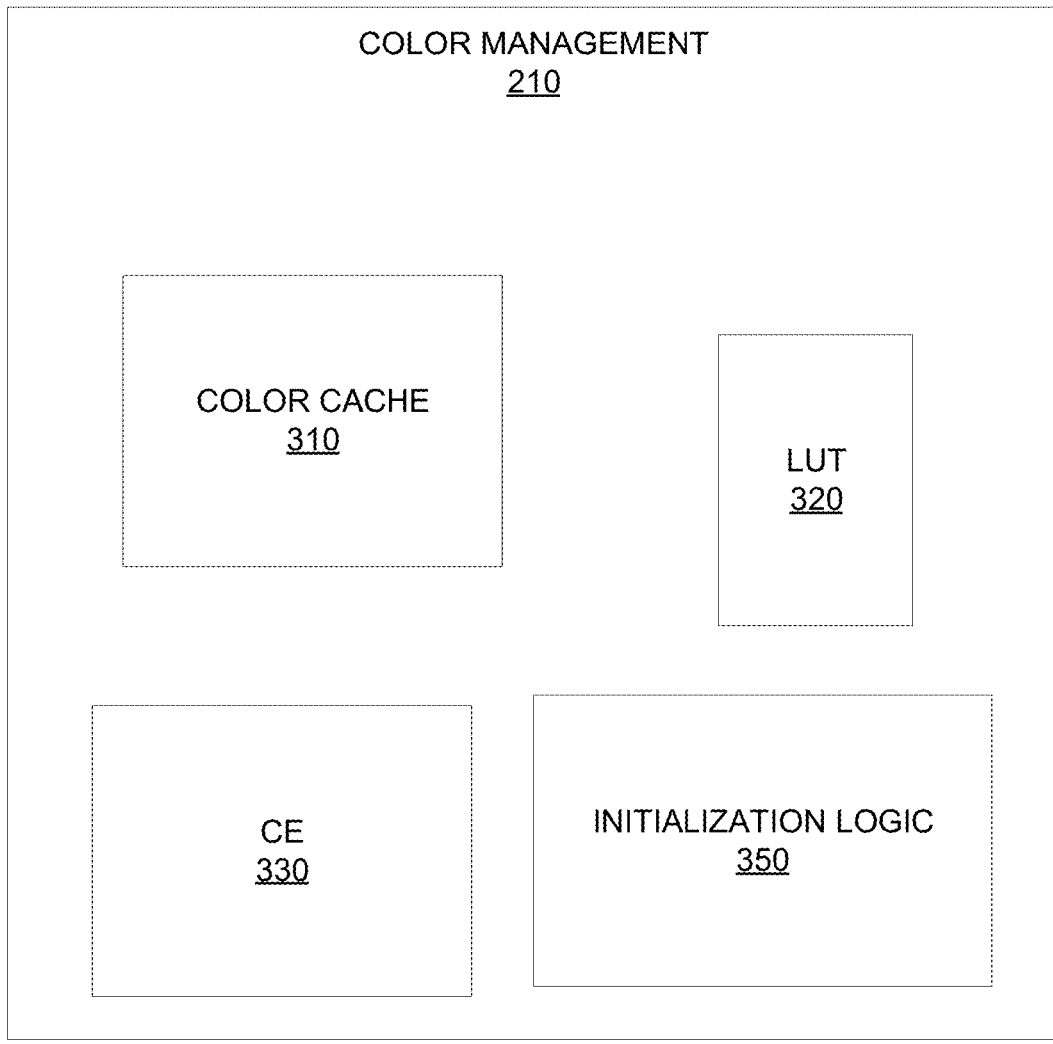
FIG. 3 illustrates one embodiment of a color management unit.

In one embodiment, color management unit 210 performs a color managed workflow by mapping input to output colors to determine CMYK values for each pixel in a particular object to be printed at printer 160. FIG. 3 is a block diagram illustrating one embodiment of a color management unit 210. Color management unit 210 includes a color cache 310 and a color lookup table (LUT) 320. Color cache 310 may be hardware and/or software components that store color mapping data so that future requests for that data can be served faster. In one embodiment, color management unit 210 also includes a color engine (CE) 330 to perform a color management operation upon receiving an input color.

Figure 4:
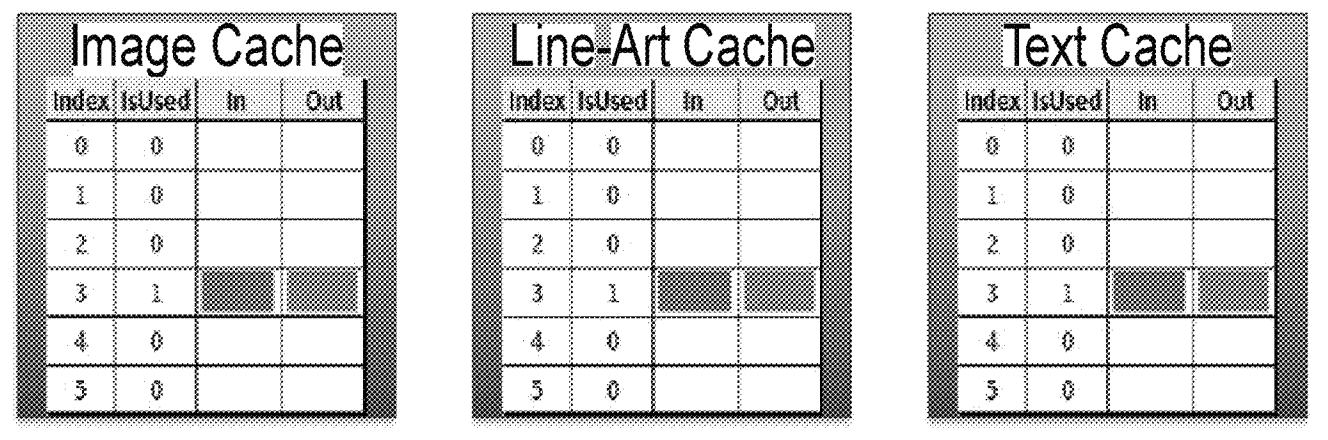

As discussed above, conventional color conversion implementations employ the inefficiency of requiring a separate cache to store mappings for each object type. For instance, FIG. 4 illustrates separate cache structures for each of image, line-art and text object types. In addition to the previously described inefficiencies, another is that there are often only a few colors that need to be cached for some object types (e.g., text) and a far greater number for other object types (e.g., image). As a result, the cache for the first types may be relatively empty, while the cache for the second types may be filled; requiring multiple resets. Moreover, multi-cache implementations often result in extended caching and retrieval times when objects are stored in higher level caches.

Figure 5:
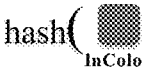
FIG. 5 illustrates one embodiment of a color cache.

According to one embodiment, color cache 310 is implemented as a single cache structure to store color mapping data for multiple object types. In a cache structure, a notional sorting (e.g., a theoretical sorting where the cache elements are shown in the order in which a hash index search would traverse the cache structure) results in elements (or entries) in the back being always unused, relative to the particular hash index being searched for. This arises because the size of the cache is prime (e.g., a cyclic group in which every element is a generator). FIG. 5 illustrates one embodiment of a notionally resorted cache.

Given that the back of a notionally sorted cache, relative to an index, is always empty (provided the cache is not yet full), overrides may be inserted on a per object basis there without fear of causing collision or erroneous matches. Overrides are one or more entries that are initially stored in the cache and may be, but are not limited to, color substitutions, forced/preserved colors, or rich-black colors. These overrides may be object type specific. Colors that are not overrides, such as interpolated colors, may be processed separately as explained below. When the cache is reset, typically only stored interpolated colors are reset and stored overrides persist. Thus in some embodiments, CE 330 is configured to perform reverse (or backwards) indexing to search the overrides of a particular object type. Within a Cyclic Group, the rules of distribution and associatively hold:

Define: +=Normal Addition $\oplus_n$=Modular Addition e.g., $x \oplus_n y = (x+y)(\bmod n)$ Then: $x \oplus_n y \oplus_n y \oplus_n y \oplus_n y = x \oplus_n 4y$ Additionally, within a Cyclic Group, every element has an additive inverse, which enables backwards indexing of the table. According to one embodiment, CE 330 tracks a range within color cache 310 for overrides of each stored object type. Thus, each object type has a reverse-range for overrides to avoid collisions with other object types. In such an embodiment, the reverse step range for each object type stored in color cache 310 is tracked by an associated Step Offset value and a Max Step value. The Step Offset value provides an offset indicating a number of steps backwards in color cache 310 at which to begin searching for a location to store or retrieve an input color for an object type. The Max Step value provides an indication of a maximum total number of backwards steps taken through the color cache 310 for the object type. Thus, the Step Offset value and Max Step value provide a step range of storage entries for each object type in order to avoid confusion with the entries of another object type.

In a further embodiment, CE 330 also performs forward-indexing for other types of stored entries such as common overrides and interpolated values during conventional color conversion operations. However, prior to operation as a single cache structure for storing color mapping data for multiple object types, color cache 310 is initialized to enable the performance of backwards indexing. Accordingly, color management module 210 includes initialization logic 350 to initialize color cache 310.

Figure 6:
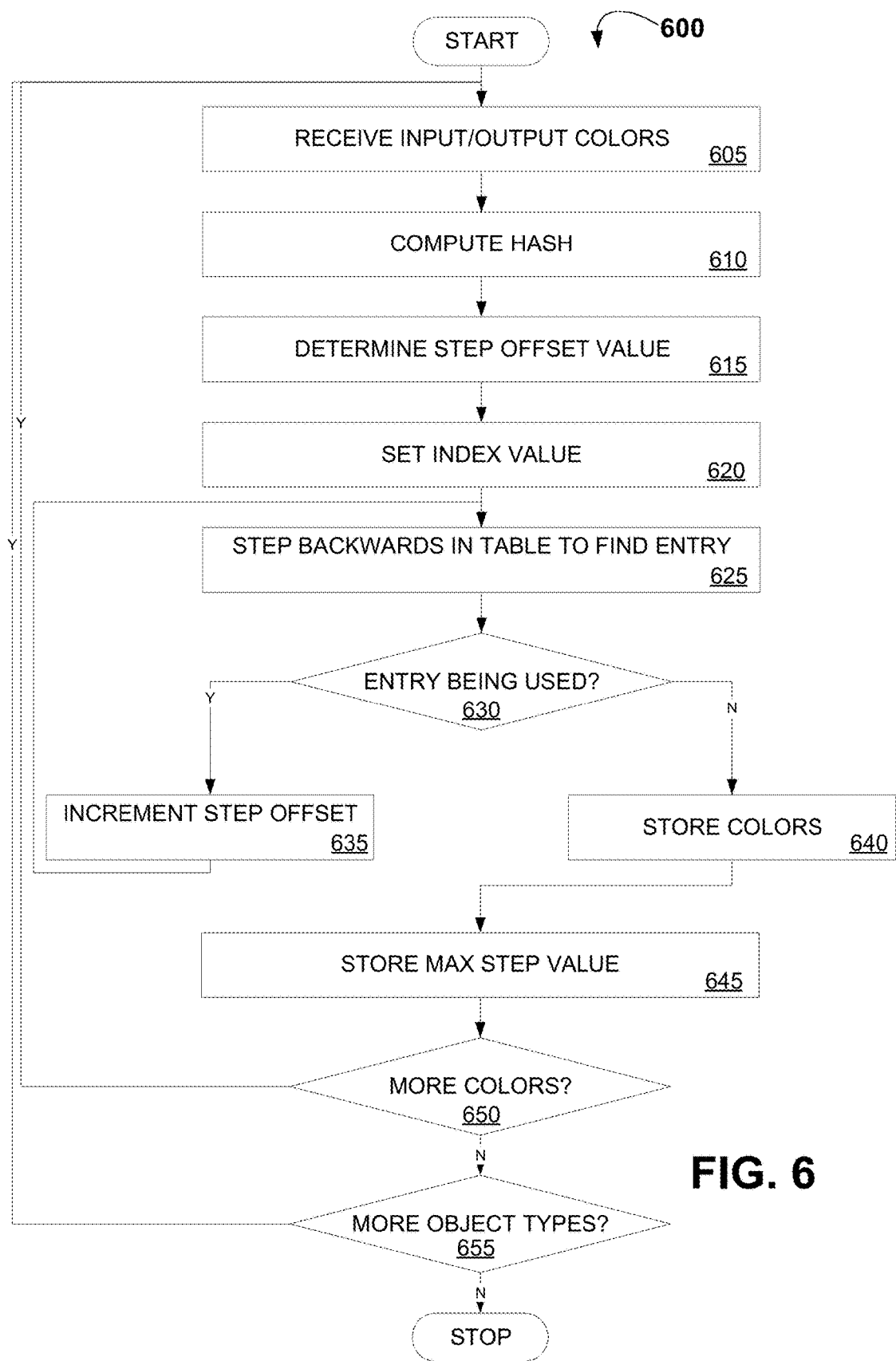
FIG. 6 is a flow diagram illustrating one embodiment of a process for initializing a multi-object color cache.

FIG. 6 is a flow diagram illustrating one embodiment of a process 600 for initializing a multi-object color cache. Process 600 may be performed by processing logic that may comprise hardware (e.g., circuitry, dedicated logic, programmable logic, etc.), software (such as instructions run on a processing device), or a combination thereof. In one embodiment, process 600 may be performed by initialization logic 350. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 605, where an input color and corresponding output color is received for an object type. The object types are arranged in a sequence and numbered from 1 to the total number of object types. The overrides of each object type are processed using Process 600 in object type sequence order. Each object type's color overrides must be completely processed before proceeding to the next object type in the object type sequence order. At processing block 610, a hash function is computed on the input color to return a hash value corresponding to the input color. At processing block 615, a Step Offset value is determined. In one embodiment, the Step Offset value is set to 1 for the first input color of a first object type being processed. However in subsequent iterations of the same object type, the Step Offset value is effectively set to the previous Max Step value of the previous object type sequence+1, as described in more detail below.

At processing block 620, the color cache 310 index is set to negative one times the hash value times the Step Offset value, modulo the size of the cache. This value is effectively a backward index into the cache. It will be appreciated that the backwards indexing is based on the object type since the Step Offset value is dependent on the object type. At processing block 625, the index is used with the color cache 310 to find a color cache 310 location (or entry) to store the input color and corresponding output color. At decision block 630, a determination is made as to whether the entry associated with the current index is being used. In one embodiment, an entry being used may be identified by a label in the color cache 310 associated with the entry. If so, the Step Offset is incremented, processing block 635. The incremented Step Offset value may be determined by adding one to the previous Step Offset value. A next index value is computed from the new Step Offset using the previously described calculation for deriving the color cache 310 index from the Step Offset.

The next index value is used as a backwards index to find the next associated color cache 310 entry, processing block 625 with control returned to decision block 630 to determine whether the next associated color cache 310 entry is being used. Otherwise, the input color and corresponding output color are stored at the entry associated with the current index, processing block 640. At processing block 645, the Max Step value for the current object type is set to the current Step Offset and the Max Step value for the current object type is stored in memory.

At decision block 650, a determination is made as to whether there are additional colors for the current object type that are to be stored. If so, control is returned to processing blocks 605-645 for storage of a subsequent input color and corresponding output color. However, at processing block 615, the Step Offset value for this iteration is effectively set to the current Max Step value+1 since the Max Step value had been set equal to the previous Step Offset value in processing block 645.

According to one embodiment, colors are added to color cache 310 in object type sequence order. Thus, once a particular object type has had all of its overrides inserted (and another object then inserted or color interpolations made) that object type cannot have any more overrides added.

Figure 7A:
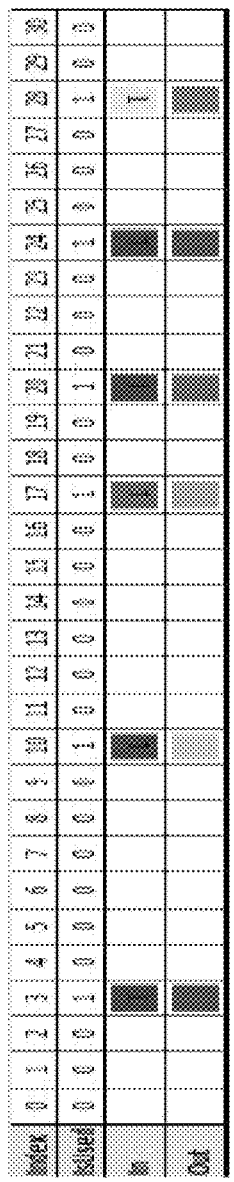
FIG. 7A-7C illustrate embodiments of a color cache.

If at processing block 650, a determination is made that there are no additional colors for the current object type, a determination is made as to whether there are additional object types for which colors are to be stored, decision block 655. If so, control is returned for another iteration of processing blocks 605-650, where a first input color and corresponding output color is received and stored for a subsequent object type. Otherwise, process 600 is completed. FIG. 7A illustrates one embodiment of a cache, such as cache 300, after initialization.

Figure 7B:
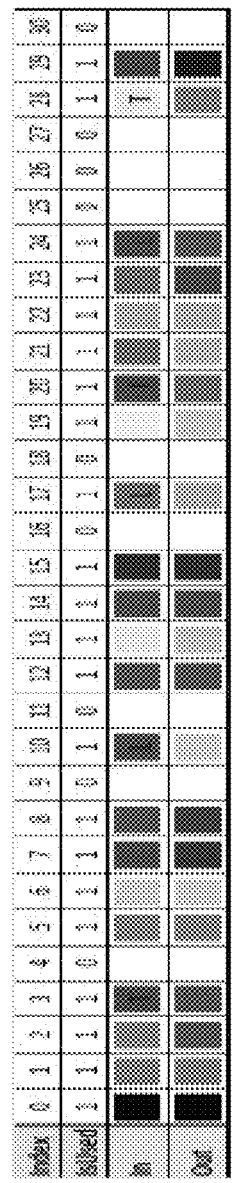
Figure 7C:
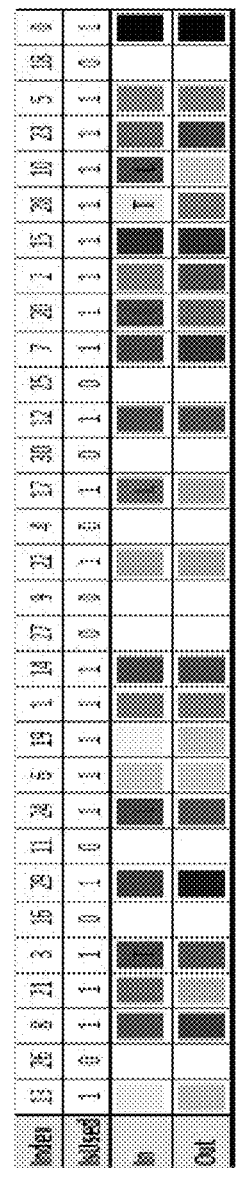
Figure 8A:
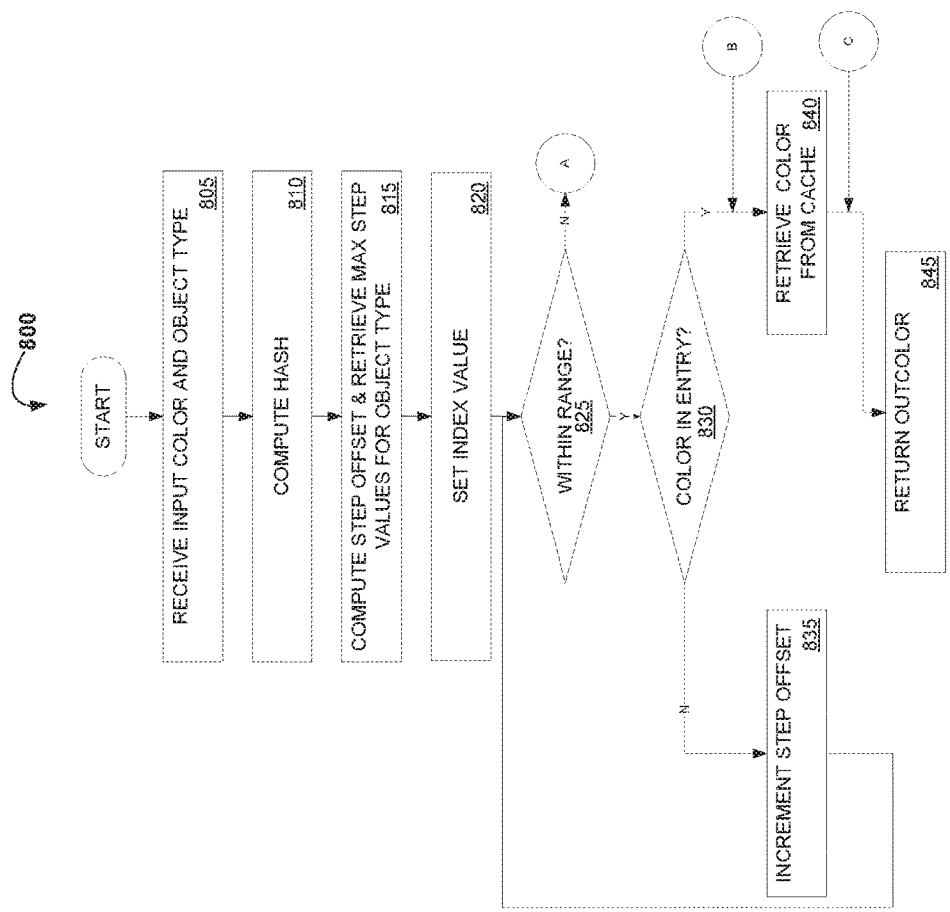
FIGS. 8A & 8B is a flow diagram illustrating one embodiment of a color management process for implementing a multi-object color cache.
Figure 8B:
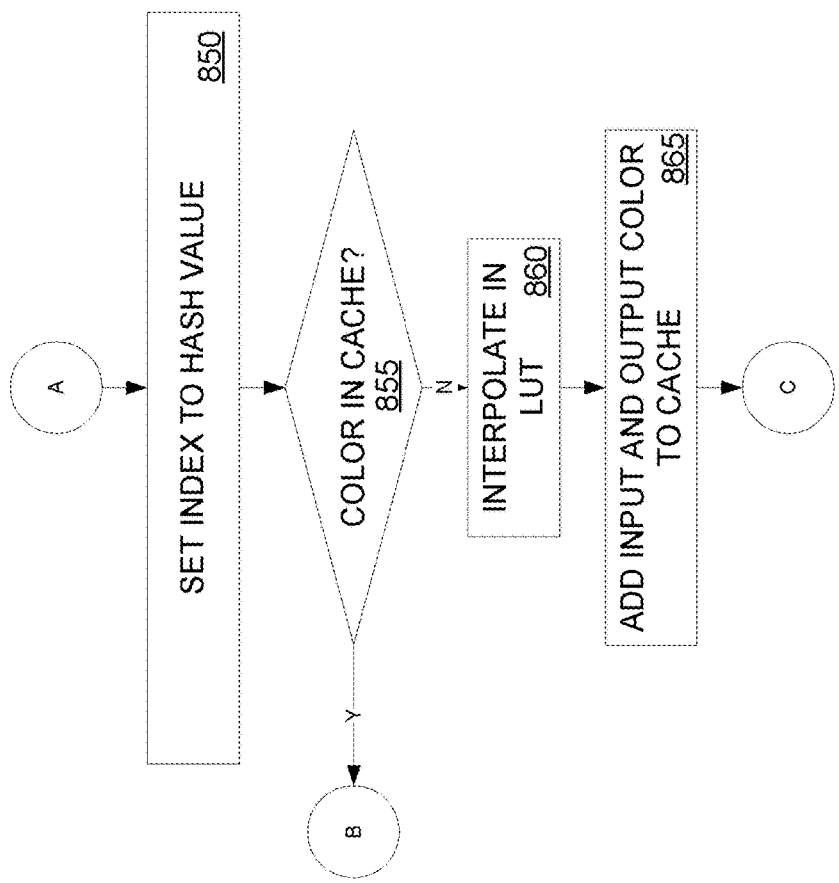

FIGS. 8A & 8B is a flow diagram illustrating one embodiment of a color management process 800 for implementing a multi-object color cache after initialization of the cache. Process 800 may be performed by processing logic that may comprise hardware (e.g., circuitry, dedicated logic, programmable logic, etc.), software (such as instructions run on a processing device), or a combination thereof. In one embodiment, process 800 may be performed by CE 330. The process 800 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-7 are not discussed or repeated here.

Process 800 begins in FIG. 8A where an input color and an associated object type are received, processing block 805. At processing block 810, a hash function is performed on the input color to obtain a hash value. At processing block 815, the Step Offset is computed and Max Step values are retrieved for the object type. The Step Offset is set to the Max Step value of the previous object type in the object type sequence, except for the first object type. For the first object type, the Step Offset is set to 1. At processing block 820, the index is set to negative one times the hash value times the Step Offset value, modulo the cache size. It will be appreciated that the backwards indexing is based on the object type since the Step Offset value is dependent on the object type. As a result, a backwards indexed search for the input color is to be performed starting at the first entry of the step range corresponding to the object type.

At decision block 825, a determination is made as to whether the Step Offset is within the step range designated for the object type. In one embodiment, the step range is from the initial Step Offset computed above to Max Step for the current object type. Upon a determination that the Step Offset is within the step range designated for the object type, the index associated with the Step Offset is computed (as previously described), resulting in a backward index, and a determination is made as to whether the input color is stored at the index location (or entry) in color cache 310, decision block 830. If the color is not at the entry, the Step Offset is incremented, processing block 835. The incremented Step Offset value may be determined by adding one to the previous Step Offset value. Control is returned to decision block 825, where a determination is made as to whether the incremented Step Offset value is within the step range designated. If, however, the color is stored at the entry, an output color corresponding to the input color is retrieved from color cache 310, processing block 840. At processing block 845, the output color is returned and color management module 210 may transmit the output color to other modules and/or devices.

If at decision block 825, there is a determination that the Step Offset is no longer within the step range designated for the object type, forward indexing is to be implemented to search color cache 310. As a result, the index is set to the hash value, effectively forward indexing, at processing block 850 (FIG. 8B). At decision block 855, a determination is made as to whether the input color is in color cache 310. If so, control is returned to processing blocks 840 and 845, where the output color corresponding to the input color is retrieved from color cache 310 and returned.

If at decision block 855, a determination is made that the input color is not in color cache 310, a multi-dimensional interpolation is performed at LUT 320, processing block 860. At processing block 865, the input color and the corresponding output color are stored in color cache 310 at the entry associated with the forward indexing. Subsequently, control is returned to processing block 845 where the output color is returned. FIG. 7B illustrates one embodiment of the previously initialized cache after interpolations have been performed. FIG. 7C illustrates one embodiment of the cache after it has been notionally resorted to a particular hash/index value, in this case, 13.

The above-described mechanism reduces the amount of memory typically used for separate color caches. Thus, the overall size of the single cache may be increased. Moreover, the single cache decreases cache reset intervals and, by extension, decreases overall interpolation time. Additionally, the occurrence of cache collisions is fewer, thus decreasing search times. The single cache implementation also allows for across object type interpolations to be leveraged, resulting in a decrease in overall interpolation time.

Although the above embodiments for multi-object color caching were illustrated in print controller 140, the concepts described above may be implemented in other types of systems that cache data for multiple objects. The above methods of storage and retrieval in a multi-object cache may be used in virtually any system processing data for multiple objects.

Figure 9:
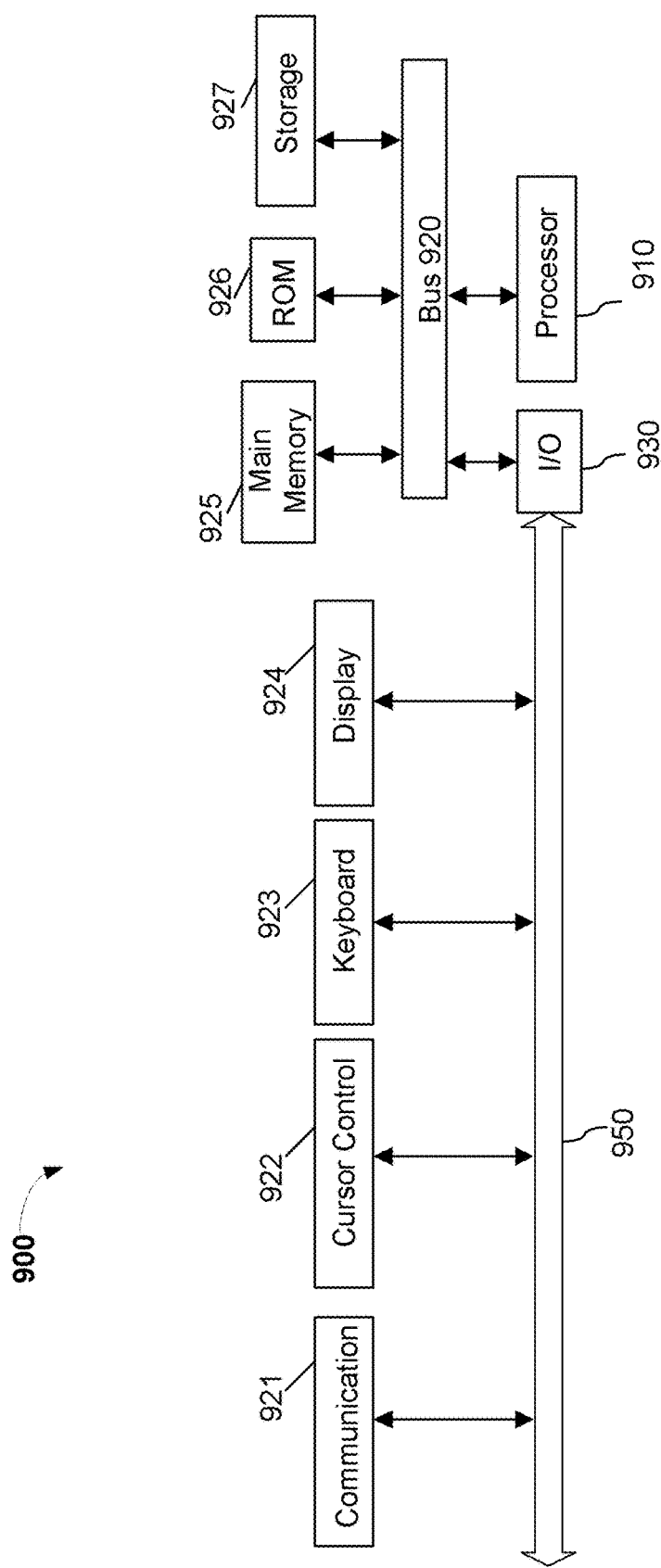
FIG. 9 illustrates one embodiment of a computer system.

FIG. 9 illustrates a computer system 900 on which printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and/or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
   a print controller, including:
      a color cache to store input colors and corresponding output colors for each of a plurality of object types; and
      a color engine (CE) to receive an input color and object type associated with the input color and perform a lookup of the color cache to determine whether the color cache includes the input color and a corresponding output color, wherein the CE performs the lookup of the color cache via forward indexing and backwards indexing.

2. The printing system of claim 1, wherein the CE performs the backwards indexing based on the object type to lookup the color cache to find the input color and the corresponding output color.

3. The printing system of claim 1, wherein the CE initiates the color cache prior to performing a color cache lookup by storing color entries in the color cache for each of the plurality of object types, determining a step offset value based on the object type indicating a number of backwards steps in the color cache to access a range of color cache locations for each of the plurality of object types and determining a maximum step value based on the object type indicating a total number of backwards steps taken through the color cache for each of the plurality of object types.

4. The printing system of claim 3, wherein the CE stores the color entries in the color cache for the object type by receiving the input color and the corresponding output color and determining a backwards index based on the object type indicating a first location in the color cache at which to store the input color and the corresponding output color.

5. The printing system of claim 4, wherein the CE further stores the color entries in the color cache for the object type by storing the input color and the corresponding output color in the color cache and updating the maximum step value for the object type upon a determination that the first location in the color cache is not being used.

6. The printing system of claim 5, wherein the CE further stores the color entries in the color cache for an object type by determining a second backwards index based on the object type indicating a second location in the color cache at which to store the input color and the corresponding output color upon a determination that the first location in the color cache is being used.

7. The printing system of claim 5, wherein the CE further stores the color entries in the color cache for the object type by receiving a second input color and a corresponding second output color and determining a second backwards index based on the object type as being a second location in the color cache following the location indicated by the maximum step value.

8. The printing system of claim 7, wherein the CE further stores the color entries in the color cache for the object type by storing the second input color and the corresponding second output color in the color cache and updating the maximum step value for the object type upon a determination that the second location in the color cache is not being used.

9. The printing system of claim 3, wherein the CE further performs a lookup of the color cache by receiving an input color and an object type associated with the input color, determining a backwards index based on the object type indicating a first location in the color cache at which to lookup and performing the lookup to determine whether the input color is stored at the first location.

10. The printing system of claim 9, wherein the CE further performs the lookup of the color cache by returning the corresponding output color upon a determination that the input color is stored at the first location.

11. The printing system of claim 10, wherein the CE further performs the lookup of the color cache by determining a second backwards index based on the object type indicating a second location in the color cache at which to perform the lookup of the color cache upon a determination that the input color is not stored at the first location.

12. The printing system of claim 11, wherein the CE further performs the lookup of the color cache by determining whether the second backwards index is within a range of color cache locations for the object type prior to performing the lookup of the color cache.

13. The printing system of claim 12, wherein the CE further performs the lookup of the color cache by determining a forward index to perform the lookup of the cache upon a determination that the backwards index is not within the range of color cache locations for the object type.

14. At least one non-transitory computer readable medium having instructions stored thereon, which when executed by one or more processors, cause the processors to:
  receive an input color;
  receive an object type associated with the input color; and
  perform a lookup of a color cache via backwards indexing to determine whether the color cache includes the input color and a corresponding output color, wherein the color cache stores input colors and the corresponding output colors for each of a plurality of object types.

15. The computer readable medium of claim 14, having instructions stored thereon, which when executed by one or more processors, further cause the processors to initiate the color cache prior to performing a color cache lookup, including:
  storing color entries in the color cache for each of the plurality of object types;
  determining a step offset value based on the object type indicating a number of backwards steps in the color cache to access a range of color cache locations for each of the plurality of object types; and
  determining a maximum step value based on the object type indicating a total number of backwards steps taken through the color cache for each of the plurality of object types.

16. The computer readable medium of claim 15, wherein storing the color entries in the color cache for the object type comprises:
  receiving the input color and the corresponding output color;
  determining a backwards index based on the object type indicating a first location in the color cache at which to store the input color and the corresponding output color;
  storing the input color and the corresponding output color in the color cache upon a determination that the first location in the color cache is not being used; and
  updating the maximum step value for the object type.

17. The computer readable medium of claim 16, wherein storing the color entries in the color cache for the object type further comprises determining a second backwards index based on the object type indicating a second location in the color cache at which to store the input color and the corresponding output color upon a determination that the first location in the color cache is being used.

18. The computer readable medium of claim 14, wherein performing the lookup of the color cache comprises:
  receiving an input color and an object type;
  determining a backwards index based on the object type indicating a first location in the color cache at which to lookup;
  performing a lookup to determine whether the input color is stored at the first location; and
  returning the output color corresponding to the input color upon a determination that the input color is stored at the first location.

19. The computer readable medium of claim 18, wherein performing the lookup of the color cache further comprises:
  determining a second backwards index based on the object type indicating a second location in the color cache at which to perform the lookup of the color cache upon a determination that the input color is not stored at the first location; and
  determining whether the second backwards index is within a range of color cache locations for the object type prior to performing the lookup of the color cache.

20. The computer readable medium of claim 18, wherein performing the lookup of the color cache further comprises determining a forward index to perform the lookup of the cache upon a determination that the backwards index is not within the step range of color cache locations for the object type.

* * * * *